United States Patent
Wakumoto et al.

(10) Patent No.: US 10,348,684 B2
(45) Date of Patent: Jul. 9, 2019

(54) FILTERING OF PACKETS FOR PACKET TYPES AT NETWORK DEVICES

(71) Applicant: HEWLETT PACKARD ENTERPRISE DEVELOPMENT LP, Houston, TX (US)

(72) Inventors: Shaun Wakumoto, Roseville, CA (US); Freeman Yufei Huang, Roseville, CA (US); Tomas Navarro, Roseville, CA (US); Nam Soo Kim, Roseville, CA (US); Bruce E Lavigne, Roseville, CA (US); Jechun Chiu, Austin, TX (US); Sebastien Tandel, Porto Alegre (BR)

(73) Assignee: Hewlett Packard Enterprise Development LP, Houston, TX (US)

( * ) Notice: Subject to any disclaimer, the term of this patent is extended or adjusted under 35 U.S.C. 154(b) by 107 days.

(21) Appl. No.: 15/255,095

(22) Filed: Sep. 1, 2016

(65) Prior Publication Data

US 2018/0063084 A1    Mar. 1, 2018

(51) Int. Cl.
*H04L 29/06* (2006.01)
*H04L 29/12* (2006.01)

(52) U.S. Cl.
CPC ...... *H04L 63/0245* (2013.01); *H04L 61/1511* (2013.01); *H04L 63/0263* (2013.01); *H04L 63/101* (2013.01)

(58) Field of Classification Search
CPC ... H04L 63/24; H04L 63/0263; H04L 63/101; H04L 63/0245; H04L 61/1511
See application file for complete search history.

(56) References Cited

U.S. PATENT DOCUMENTS

| | | |
|---|---|---|
| 8,160,069 B2 | 4/2012 | Jacobson et al. |
| 8,199,652 B2 | 6/2012 | Lim |
| 2007/0115986 A1* | 5/2007 | Shankara ............ H04L 63/145 370/392 |

(Continued)

FOREIGN PATENT DOCUMENTS

CN    101848222 A    9/2010

OTHER PUBLICATIONS

C. Sun, B. Liu and L. Shi, "Efficient and Low-Cost Hardware Defense Against DNS Amplification Attacks," IEEE GLOBECOM 2008—2008 IEEE Global Telecommunications Conference, New Orleans, LO, 2008, pp. 1-5. (Year: 2008).*

(Continued)

*Primary Examiner* — Alexander Lagor
*Assistant Examiner* — Vu V Tran
(74) *Attorney, Agent, or Firm* — Hewlett Packard Enterprise Patent Department

(57) ABSTRACT

Examples include a network device to filter a packet for a packet type. The network device includes a filter to receive the packet and to determine whether the packet is a defined packet type. The network device also includes a Bloom filter to receive the packet from the filter based on the determination that the packet is a defined packet type and to determine whether the packet is a matched packet or an unmatched packet. A processing resource of the network device may receive the packet from the Bloom filter based on the determination that the packet is a matched packet and to determine whether the packet is an exact match.

14 Claims, 11 Drawing Sheets

(56) References Cited

U.S. PATENT DOCUMENTS

| | | | |
|---|---|---|---|
| 2012/0275466 A1 | 11/2012 | Bhadra et al. | |
| 2014/0153435 A1* | 6/2014 | Rolette | H04L 63/0245 |
| | | | 370/252 |
| 2017/0180380 A1* | 6/2017 | Bagasra | H04L 63/101 |
| 2017/0353494 A1* | 12/2017 | Krinos | H04L 63/10 |

OTHER PUBLICATIONS

UzmaSattar, T. Naqash, M. R. Zafar, K. Razzaq and F. bin Ubaid, "Secure DNS from amplification attack by using modified bloom filters," Eighth International Conference on Digital Information Management (ICDIM 2013), Islamabad, 2013, pp. 20-23. (Year: 2013).*

Ashish Goel and Pankaj Gupta, "Small Subset Queries and Bloom Filters Using Ternary Associative Memories, with Applications," Jun. 2010, pp. 1-12, ACM.

Atsushi Ooka, "Hardware Design and Evaluation of CAM-based High-speed CCN Router," Feb. 10, 2014, pp. 1-39, Master's Thesis, Osaka University.

Martin J. Reed et al., "Stateless Multicast Switching in Software Defined Networks," Nov. 19, 2015, pp. 1-7.

Sarang Dharmapurikar et al., "Fast Packet Classification Using Bloom Filters," Jan. 1, 2006, pp. 1-31, Washington University in St. Louis, Report No. 2006-27.

Yuhua Chen et al., "Power Efficient Packet Classification Using Cascaded Bloom Filter and Off-the-shelf Ternary Cam for WDM Networks," Feb. 12, 2009, pp. 1-4, Elsevier B.V.

Sarang Dharmapurikar et al., "Deep Packet Inspection using Parallel Bloom Filters," Sep. 2003, pp. 1-8, Washington University in St. Louis.

* cited by examiner

FILTERING OF PACKETS FOR PACKET TYPES AT NETWORK DEVICES

BACKGROUND

Security considerations, network capability considerations, or other like considerations may prompt an organization or service provider to restrict transmittal of packets having certain characteristics, for instance, packets directed to certain domains. As an example, some organizations or providers may implement a blacklist functionality for their network such that access is restricted to any domains included in a blacklist. Some organizations or providers may instead, or in addition, implement a whitelist functionality such that access is allowed only to those domains included in the whitelist. Accordingly, packets entering or traversing such a network may need to be filtered based on this blacklist or whitelist functionality.

BRIEF DESCRIPTION OF THE DRAWINGS

The following detailed description references the drawings, wherein.

DETAILED DESCRIPTION

Figure 1:
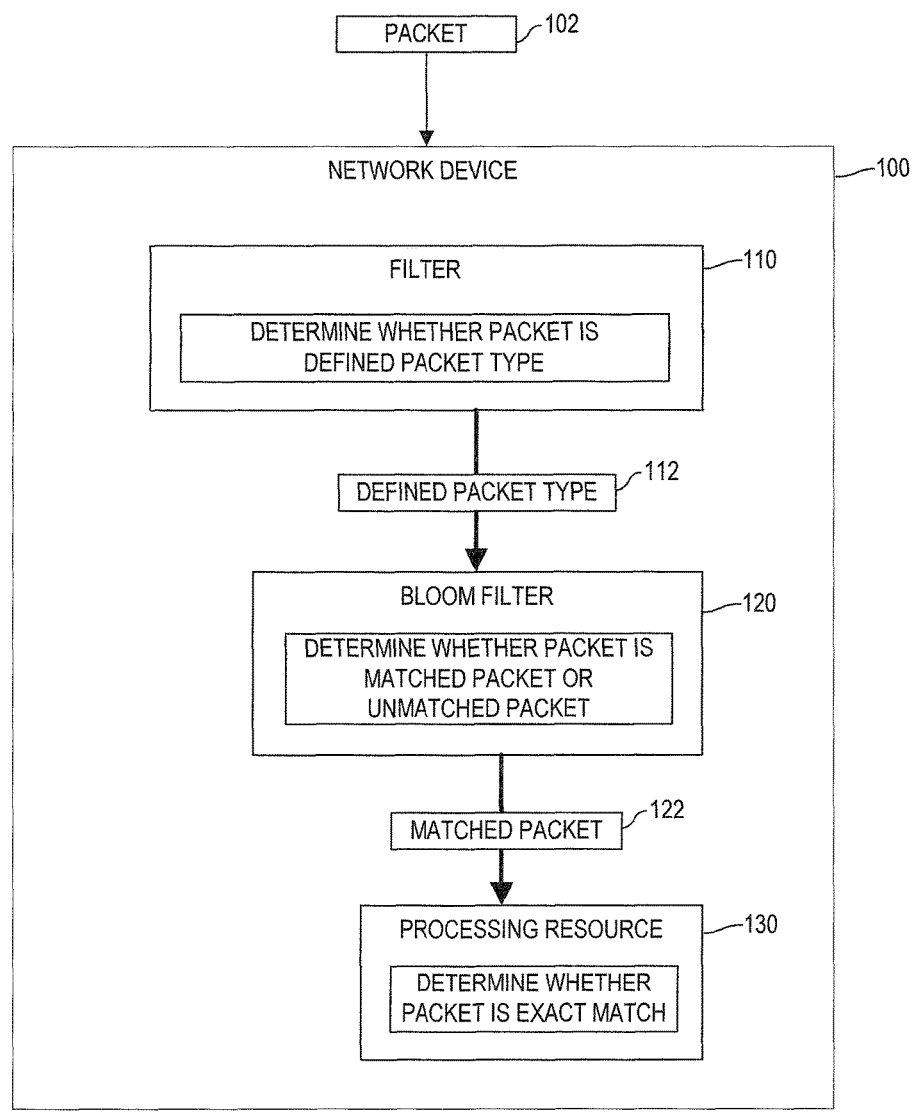
FIG. 1 is a block diagram of an example network device including a filter, Bloom filter, and processing resource to filter a packet for a packet type.

In some scenarios, organizations and service providers may restrict access to certain functionalities or domains in a network based on a particular packet's characteristics. In one example, packets exhibiting characteristics indicative of a virus or other security risk may be filtered out. In another example, an organization may restrict or prevent access to certain domains. In such an example, blacklist or whitelist functionalities may be used to disallow or allow access to domains. A blacklist functionality may disallow access to those domains listed on the blacklist, whereas a whitelist functionality may allow access to the domains listed on the whitelist while disallowing access to any other domains.

In some examples, a blacklist or whitelist functionality may be implemented by an organization or provider at a centralized network location such as a software defined networking (SDN) controller, firewall, or gateway. The SDN controller may analyze all domain name service (DNS) requests traversing a network to prevent or allow access to certain domains. In other such examples, an SDN controller may control or have responsibility for a portion of a network and analyze all DNS requests traversing that portion of the network to prevent or allow access to certain domains. Similarly, a firewall or network gateway may analyze all packets or DNS requests directed to a particular network to prevent or allow access to that network. In some examples, SDN controllers, firewalls, and network gateways may be implemented via a firmware or software-defined solution.

But SDN controllers, firewalls, network gateways, and other centralized or largely centralized network solutions may result in performance bottlenecks, slowing network throughput, and negatively impacting network users. Such centralized solutions, having very high throughputs, may also be prohibitively expensive and/or prohibitively complex to maintain. In some such examples, software-implemented solutions may be unable to keep up with the line-rate, slowing performance and requiring larger, more complicated solutions.

Examples described herein may allow for distributed filtering of packets to offload the burden on a centralized solution such as a SDN controller, firewall, or network gateway, resulting in greater flexibility and greater throughput and speed of packets through the network. In some such examples, a hardware solution may be implemented to achieve a higher and less expensive throughput via edge devices such as routers and distribution layer devices such as network switches.

In some examples described herein, a network device may filter a packet for a packet type. The network device may comprise a filter to receive the packet and to determine whether the packet is a defined packet type. The network device may further comprise a Bloom filter to receive the packet based on the determination that the packet is a defined packet type, and to determine whether the packet is a matched packet or an unmatched packet. Based on the determination that the packet is a matched packet, the packet may be received at a processing resource of the network device to determine whether the packet is an exact match. In some examples, the network device is an edge device, a switch, a router, or a combination thereof. In other examples, the filter is a ternary content addressable memory (TCAM) filter, a look-up table, or hardcoded logic. In yet other examples, the defined packet type is a domain name service (DNS) request.

In some examples described herein, a system to filter a packet for a packet type comprises a software defined networking (SDN) controller to control a list of domains and to selectively filter the packet. The list of domains may be a blacklist of domains or a whitelist of domains. The system may also comprise a network device to filter the packet for a packet type and to receive the list of domains from the SDN controller. The network device comprises a TCAM filter to receive the packet and to determine whether the packet is a defined packet type. The defined packet type, in some examples, may be a DNS request. The network device further comprises a Bloom filter to receive the packet from the TCAM filter based on the determination that the packet type is a defined packet type. The Bloom filter compares the packet against the list of domains to determine whether the packet is a matched packet or an unmatched packet. Based on the determination that the packet is a matched packet, a processing resource of the network device receives the packet from the Bloom filter. The processing resource determines whether the packet is an exact match. In some examples, the network device is an edge device, a switch, a router, or a combination thereof.

In some examples described herein, the list of domains controlled by the SDN controller of the system is a blacklist of domains. Based on the determination that the packet is an exact match, the processing resource of the network device drops the packet and sends an error message to indicate an error to a sender of the packet. Based on the determination that the packet is an unmatched packet or that the packet is not an exact match, the packet may be forwarded to the SDN controller. In other examples described herein, the list is a whitelist of domains and based on the determination that the packet is an exact match, the processing resource of the network device forwards the packet according to a normal forwarding procedure to resolve the DNS request. Based on the determination that the packet is an unmatched packet or that the packet is not an exact match, the packet may be forwarded to the SDN controller.

In some examples described herein, a method of filtering a packet for a packet type at a network device may include receiving the packet at a filter of the network device and determining, at the filter, whether the packet is a defined packet type, the defined packet type being a DNS request. Based on the determination that the packet is not a defined packet type, the packet may be forwarded according to a normal forwarding process. Based on the determination that the packet is a defined packet type, the packet may be received at a Bloom filter of the network device from the filter. The Bloom filter may determine whether the packet is a matched packet or an unmatched packet and based on the determination that the packet is a matched packet, the packet may be received at a processing resource of the network device from the Bloom filter. The processing resource may determine whether the packet is an exact match. In some examples, the Bloom filter may receive a list of domains from an SDN controller, the list comprising a whitelist of domains, a blacklist of domains, a monitor list of domains, or a combination thereof. In some such examples, the Bloom filter may determine whether the packet is a matched packet or an unmatched packet by comparing the packet against the list of domains.

In some examples described herein, the method may further comprise dropping the packet and sending an error message to indicate an error to a sender of the packet based on the determination that the packet is an unmatched packet or the determination that the packet is not the exact match. The method may also comprise forwarding the packet according to a normal forwarding procedure based on the determination that the packet is an exact match. In other examples described herein, the method may further comprise forwarding the packet according to a normal forwarding procedure based on the determination that the packet is an unmatched packet or the determination that the packet is not an exact match. The method may also comprise dropping the packet and sending an error message to indicate an error to a sender of the packet based on the determination that the packet is an exact match. In examples described herein, a determination, action, etc., that is said to be "based on" a given condition may be based on that condition alone or based on that condition and other condition(s).

Referring now to the drawings, FIG. 1 is a block diagram of an example network device 100, comprising filter 110, Bloom filter 120, and processing resource 130, to filter a packet 102 for a packet type. In the examples described herein, a network device is a computing device to provide networking functionality. The network device may be located at an access layer to provide a user device with access to the network or the network device may be located at a network infrastructure to connect network segments. In some examples, the network device may be a switch, router, or access point. The network device may also be an edge device. Filtering packets for a packet type at such a network device allows for filtering to occur in a distributed fashion such that each network device filters a relatively small portion of the total packets traversing a network, thus mitigating performance bottlenecks that may be caused by a centralized filtering solution.

A packet, as used herein, refers to a formatted unit of data that may be transmitted by a network. Packet 102 may include a packet header and a payload, also known as the packet body. The packet header may include addressing and other information about the data in the payload. The payload may include the actual data being carried by the packet.

A packet type, as used herein, may refer to a characteristic of a packet by which the packet may be filtered. In some examples, the packet type or characteristic may be the packet's destination or the packet's point of origination. In other examples, the packet type or characteristic may indicate a security risk such as a virus or phishing attack. In yet other examples, the packet type or packet characteristic may be that the packet is a domain name service (DNS) request. In other examples, the packet type or characteristic may be that the packet is a certain type of request from a certain class of hosts or servers. The packet type or characteristic may also be related to whether a packet was sent using a particular transmission protocol. For instance, in some examples, the packet type or characteristic used to filter the packet may be that the packet was sent via the Transmission Control Protocol (TCP) and has a particular bit or flag that is set such as the SYN flag, which indicates the packet is the first in a TCP flow.

In the example of FIG. 1, packet 102 may be received at filter 110 of network device 100. In some examples, network device 100 forwards packet 102 to filter 110. In other examples, filter 110 receives packet 102 directly. In yet other examples, filter 110 may monitor a certain port to "listen" for packet 102. As used herein, the filter refers to a device that examines an input for a qualifying criteria and acts accordingly. Filter 110 receives packet 102 and examines packet 102 to determine whether it is a defined packet type. The defined packet type is the particular packet type for which filter 110 filters packet 102. For example, if the defined packet type is a DNS request, filter 110 determines whether packet 102 is a DNS request. If the defined packet type is a TCP packet with a SYN flag that is set, filter 110 may determine whether packet 102 is a TCP packet and whether the SYN flag is set. Based (at least in part) on a determination that packet 102 is a defined packet type, filter 110 may forward or send the packet (i.e., defined packet type 112) to Bloom filter 120. In some examples filter 110 may be a hardware device comprising hardcoded logic for determining whether packet 102 is a defined packet type. In other examples, filter 110 may be a device with any combination of hardware and programming to implement the functionalities described herein.

In some examples, filter 110 may comprise a ternary content addressable memory (TCAM) filter. A TCAM filter, as used herein, refers to a filter that utilizes a TCAM. TCAM, as used herein, is a specialized type of high-speed memory that can search its data to determine if it matches one of three states. The TCAM filter may utilize the TCAM and additional logic to determine if packet 102 is a defined packet type and based (at least in part) on the determination that packet 102 is the defined packet type, the TCAM filter may forward the packet to Bloom filter 120. In some such examples, the TCAM filter may be implemented in hardware to better keep pace with the line rate (i.e., the speed at which bits are sent onto the wire and received at network device 100). In other examples, filter 110 may comprise a lookup table or hash table. The lookup table may be a flat look-up table or a hierarchical lookup table and may comprise one or more lookup fields that relate to a defined packet type. The hash table may be a data structure that maps a key to a value. The key may, in some examples, relate to a defined packet type.

Network device 100 further comprises a Bloom filter 120 to receive packet 102 based (at least in part) on the determination that packet 102 is the defined packet type. As shown in FIG. 1, Bloom filter 120 may receive packet 102 (depicted as defined packet type packet 112 for clarity) from filter 110. A Bloom filter, as used in the examples herein, refers to a space-efficient probabilistic data structure that tests whether an element is a member of a set. A Bloom filter may identify false positive matches, but does not identify false negatives.

Based (at least in part) on the determination that packet 102 is a defined packet type, Bloom filter 120 receives defined packet type packet 112 and examines defined packet type packet 112 to determine whether it is a matched packet or an unmatched packet. For instance, in an example in which filter 110 determines that packet 102 is a defined packet type that may indicate a security risk, Bloom filter 120 may receive the packet and determine whether the packet matches one of several different types of security vulnerabilities (e.g., a phishing attack, a known virus, a parasite, etc.). In other such examples, Bloom filter 120 may receive the packet and determine whether the packet is from one of several originating sources that may indicate a security risk. In the example in which the defined packet type is a DNS request, Bloom filter 120 may receive the packet (defined packet type packet 112) and determine whether the packet is a request to access one of several domains.

In some examples, packet 102 may be matched against entries in a Bloom table. A Bloom table, as used in the examples herein, may refer to a data structure to implement a Bloom filter. In some examples, Bloom filter 120 may receive a list of items against which to match packet 102. Bloom filter 120 may hash each item, store the item as an entry in the Bloom table, and set a bit corresponding to the entry. Upon receiving packet 102 (defined packet type packet 112), Bloom filter 120 may hash the packet or a certain number of bytes or bits of the packet and compare or match them against entries in the Bloom table to determine whether packet 102 is a matched packet or an unmatched packet.

In other examples, for instance those in which a string length being matched may be variable, Bloom filter 120 may iteratively hash a certain number of bytes or bits of packet 102 and compare the hash against the Bloom table until the string length of packet 102 has been hashed and compared. For instance, Bloom filter 120 may hash the first twelve bytes of packet 102 and determine whether the hash is listed in the Bloom table. Bloom filter 120 may next offset the first twelve bytes of packet 102 by one byte, hash the set of 12 characters at the offset location, and determine whether the hash is listed in the Bloom table. In some such examples, Bloom filter 120 may iteratively continue to offset packet 102, hash the set of characters, and compare the hash against the Bloom table until the end of packet 120 is reached. In other such examples, Bloom filter 120 may iteratively offset a portion of packet 102 rather than examining the packet to the end.

If there is a hit, the Bloom filter may determine that packet 102 is a matched packet. If there is a miss, the Bloom filter may determine that packet 102 is an unmatched packet, as described in more detail below in relation to FIGS. 3-4. Based (at least in part) on the determination that packet 102 is a matched packet, Bloom filter 120 may forward or send packet 102 (depicted as matched packet 122 for clarity) to processing resource 130. In some examples Bloom filter 120 may be a hardware device comprising hardcoded logic for determining whether packet 102 is a matched packet or an unmatched packet. In other examples, Bloom filter 120 may be a device with any combination of hardware and programming to implement the functionalities described herein. In some examples, a hardware-implemented Bloom filter may be better able to keep pace with the line rate (i.e., the speed at which bits are sent onto the wire and received at network device 100) than a software-implemented solution.

Network device 100 comprises a processing resource 130 to receive packet 102 based (at least in part) on the determination that packet 102 is a matched packet. As shown in FIG. 1, processing resource 130 may receive packet 102 (depicted as defined matched packet 122 for clarity) from Bloom filter 120. A processing resource, as used in the examples herein, may include, for example, one processor or multiple processors included in a single computing device or distributed across multiple computing devices.

As used herein, a processor may be at least one of a central processing unit (CPU), a semiconductor-based microprocessor, a graphics processing unit (GPU), a field-programmable gate array (FPGA) that retrieves and executes instructions, other electronic circuitry suitable for the retrieval and execution instructions stored on a machine-readable storage medium, or a combination thereof. In some examples, processing resource 130 may be a slave CPU or hardcoded logic that performs the functionalities described herein. In other examples, processing resource 130 may fetch, decode, and execute instructions stored on a storage medium to perform the functionalities described herein. The functionalities of any of the instructions of the storage medium may be implemented in the form of electronic circuitry, in the form of executable instructions encoded on a machine-readable storage medium, or a combination thereof.

Based (at least in part) on the determination that packet 102 is a matched packet, processing resource 130 receives matched packet 122 and examines matched packet 122 to determine whether the matched packet is an exact match. Processing resource 130 validates or invalidates matches determined by Bloom filter 120. For instance, in an example in which Bloom filter 120 determines that packet 102 is a matched packet because the packet matches one of several different types of security vulnerabilities in a Bloom table, processing resource 130 may receive packet 102 (matched packet 122) and determine whether the packet is an exact match and thus matches a security vulnerability, as determined by the Bloom filter. In the example in which Bloom filter 120 determines that packet 102 is a matched packet because the packet matches a particular domain, processing resource 130 may receive packet 102 (matched packet 122) and determine whether the packet is an exact match. Processing resource 130 may determine whether the DNS request of the packet matches a particular domain.

Processing resource 130 may access or store a list different types of security vulnerabilities, a list of domains, or other like list depending on the filtering example, and may use a look-up table to validate or invalidate matched packet 122 as an exact match. In other examples, processing resource 130 may validate or invalidate matched packet 122 as an exact match using hardcoded logic to compare matched packet 122 against the list. Based (at least in part) on a determination that matched packet 122 is an exact match or is not an exact match, processing resource 130 may forward the packet according to a normal forwarding procedure, drop the packet, or take some other like action, as described below in relation to FIGS. 2-6. In some examples, the implementation of network device 100 described herein in relation to FIG. 1 may be employed in relation to any of FIGS. 2-6.

Figure 2:
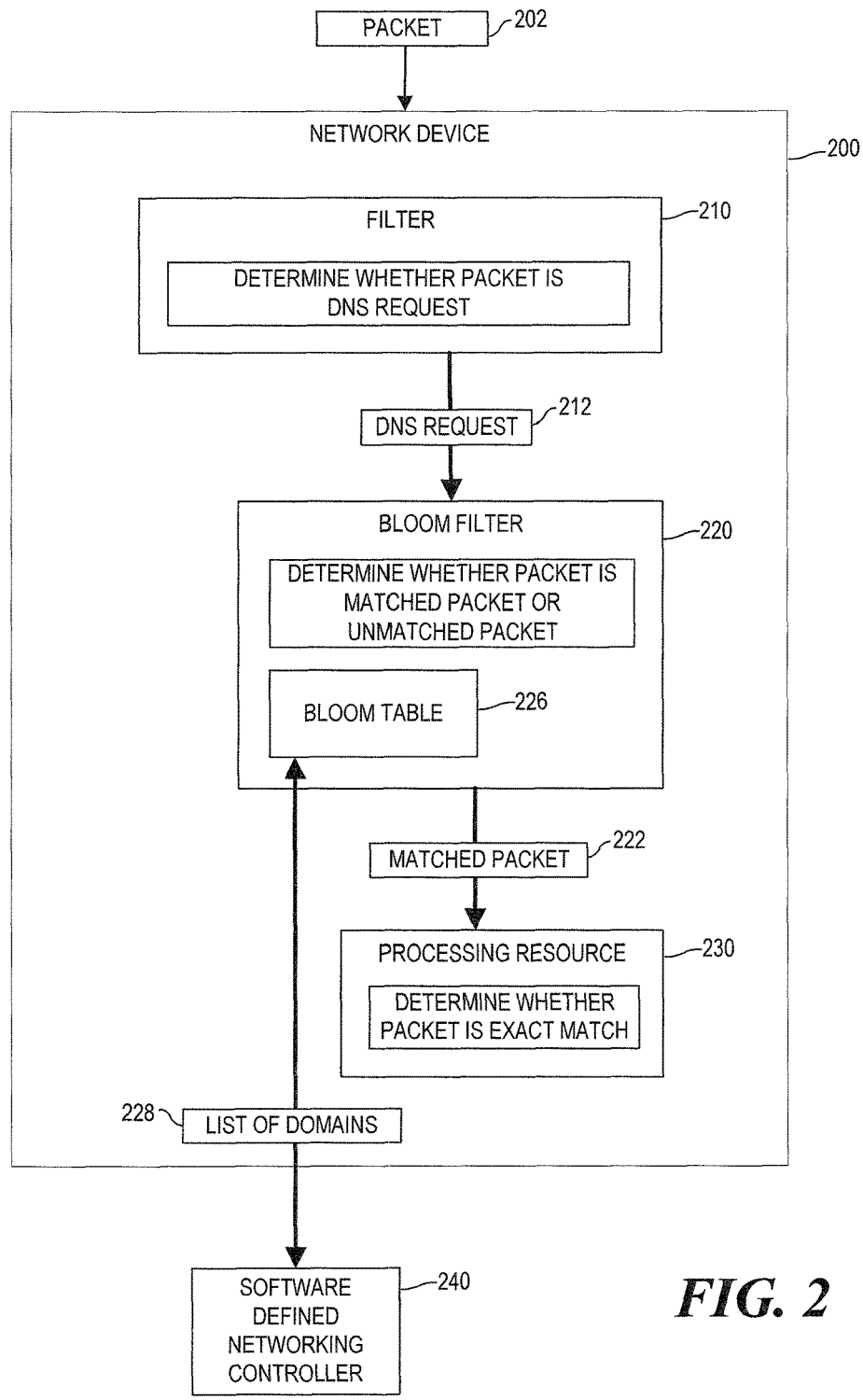
FIG. 2 is a block diagram of an example network device including a Bloom filter having a Bloom table that receives a list of domains from a software defined networking (SDN) controller.

FIG. 2 is an example network device 200, comprising filter 210, Bloom filter 220, and processing resource 230, to filter a packet 202 for a packet type. Although FIG. 2 is described with reference to FIG. 1, other systems can be utilized (e.g., system 500 of FIG. 5A, described below).

In the example of FIG. 2, packet 202 may be received at filter 210, as described above in relation to packet 102 and filter 110 of FIG. 1. Filter 210 receives packet 202 and examines packet 202 to determine whether it is a defined packet type. The defined packet type may be a DNS request. As described above in relation to filter 110 of FIG. 1, filter 210 may comprise a TCAM filter, a look-up table, a hash table, or other suitable structure to determine whether packet 202 is a DNS request. In some examples, to determine whether packet 202 is a DNS request, filter 210 may first determine whether packet 202 is an Internet Protocol (IP) packet. If packet 202 is an IP packet, filter 210 may determine if packet 202 was sent via the User Datagram Protocol (UDP) or the Transmission Control Protocol (TCP) and if so, determine whether packet 202 was sent to a destination port number associated with DNS. If so, filter 210 may determine whether packet 202 is a DNS request by examining DNS header fields. Based (at least in part) on a determination that packet 202 is a DNS request, filter 210 may forward or send the packet (depicted as DNS request packet 212 for clarity) to Bloom filter 220.

Bloom filter 220 receives packet 202 (DNS request 212) from filter 210, as described above in relation to Bloom filter 120 of FIG. 1. Bloom filter 220 examines packet 202 (DNS request 212) to determine whether it is a matched packet or an unmatched packet. As shown in the example of FIG. 2, Bloom filter 220 may comprise a Bloom table 226. As described above in relation to FIG. 1, a Bloom table is a data structure to implement a Bloom filter. In some examples, Bloom filter 220 may receive a list of domains 228 from a software defined networking (SDN) controller 240.

An SDN controller, as used herein, may refer to an application at the core of an SDN network located between network devices and applications that manages communications across the network. A list of domains, as used herein, may refer to a list of local network sites or Internet sites. In some examples, the list of domains may be a blacklist of domains that identifies domains for which access may be restricted. In other examples, the list of domains may be a whitelist of domains that identifies domains for which access may be allowed. In yet other examples, the list of domains may be a monitor list of domains that identifies domains for which access is monitored.

Bloom filter 220 may receive the list of domains 228 from SDN controller 240, hash each item in the list, and store each item as an entry in Bloom table 226, as described above in relation to Bloom filter 120 of FIG. 1. In some examples, the list of domains 228 may be a partial list of domains 228. The partial list may include the most critical domains, a number of domains that may be most easily managed by Bloom filter 220, or a subset of the most critical domains. Bloom filter 220, as described above in relation to Bloom filter 120 of FIG. 1, may compare packet 202 (DNS request packet 212) against the list of domains in Bloom table 226 and determine whether packet 202 (DNS request packet 212) is a matched packet or an unmatched packet.

Based (at least in part) on a determination that packet 202 (DNS request 212) is a matched packet, Bloom filter 220 may forward or send packet 202 (depicted as matched packet 222 for clarity) to processing resource 230. Processing resource 230 receives packet 202 from Bloom filter 220, as described above in relation to processing resource 130 of FIG. 1.

Based (at least in part) on the determination that packet 202 is a matched packet, processing resource 230 receives packet 202 (matched packet 222) and examines the packet to determine whether the packet is an exact match, as described above in relation to processing resource 130 of FIG. 1. In some examples, processing resource 230 may use a look-up table to validate or invalidate matched packet 222 as an exact match. In other examples, processing resource 230 may validate or invalidate matched packet 222 as an exact match using hardcoded logic to compare matched packet 222 against a list.

In some examples, processing resource 230 may receive and store the list of domains 228 from SDN controller 240. In other examples, processing resource 230 may access the list of domains 228 at another location. Processing resource 230 may compare packet 202 (matched packet 222) against the list of domains 228 to determine if the packet is an exact match. For instance, processing resource 230 may compare matched packet 222 (i.e., the DNS request packet 212) against the list to determine if the packet is requesting access to any of the domains in the list of domains.

Based (at least in part) on a determination that packet 202 (matched packet 222) is an exact match or is not an exact match, and based (at least in part) on whether the list of domains 228 is a blacklist, a whitelist, or a monitor list, processing resource 230 may forward the packet according to a normal forwarding procedure, drop the packet, or take some other like action, as described in relation to FIGS. 1 and 3-6. In some examples, the implementation of network device 200 described herein may be employed in relation to any of FIGS. 1 and 3-6.

Figure 3:
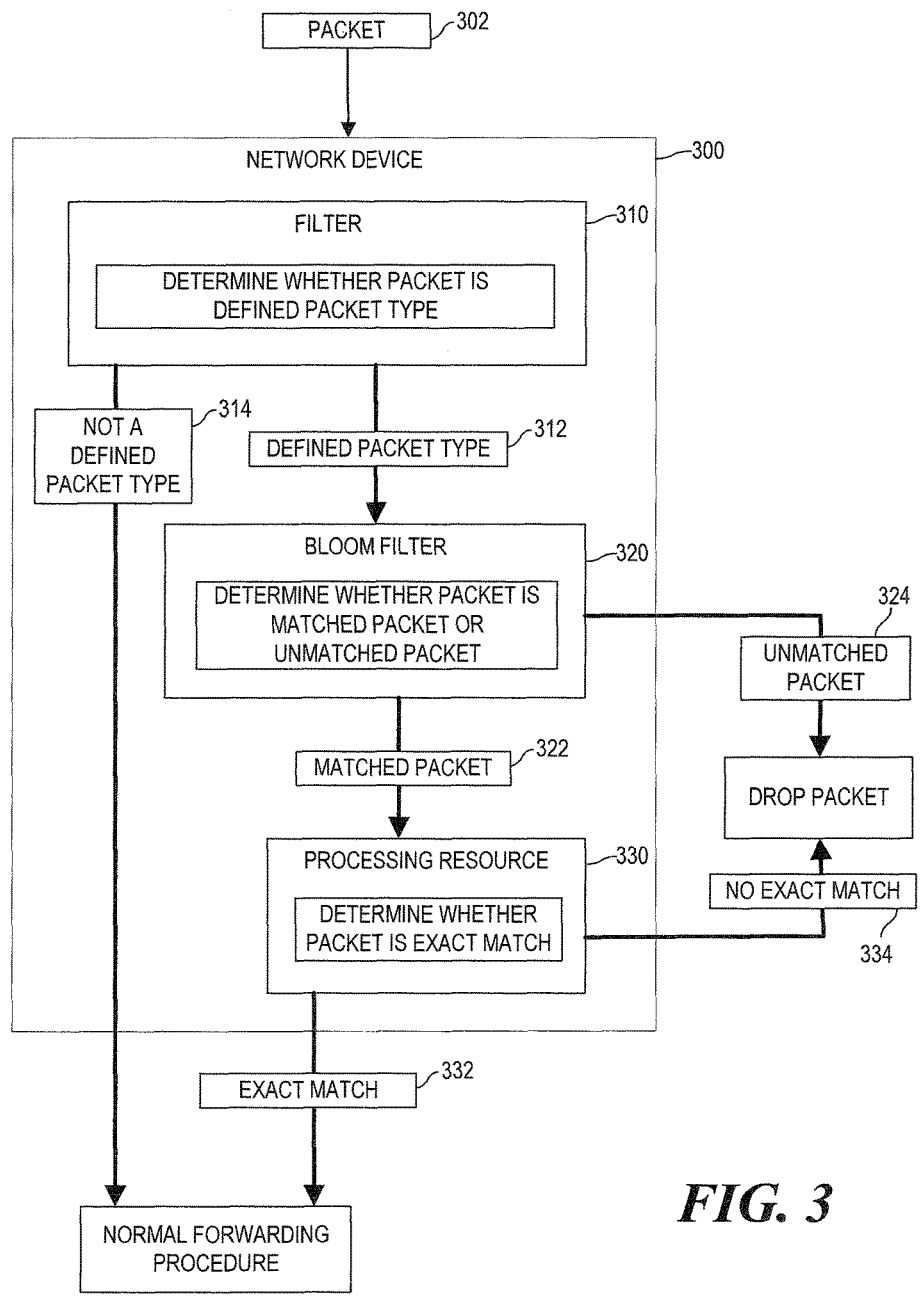
FIG. 3 is a block diagram of an example network device including a filter, Bloom filter, and processing resource that determines whether a matched packet is an exact match and forwards the exact match according to a normal forwarding procedure.

FIG. 3 illustrates an example network device 300, comprising filter 310, Bloom filter 320, and processing resource 330, to filter a packet 302 for a packet type and that implement a whitelist functionality. Although FIG. 3 is described with reference to FIG. 1, other systems can be utilized (e.g., system 500 of FIG. 5A, described below).

In the example of FIG. 3, packet 302 may be received at filter 310, as described above in relation to packet 102 and filter 110 of FIG. 1. Filter 310 receives packet 302 and examines packet 302 to determine whether it is a defined packet type. As described above in relation to filter 110 of FIG. 1, filter 310 may comprise a TCAM filter, a look-up table, a hash table, or other suitable structure to determine whether packet 302 is a defined packet type.

Based (at least in part) on a determination that packet 302 is not a defined packet type, filter 310 may forward or send the packet (depicted as not a defined packet type packet 314) according to a normal forwarding procedure. In some such examples, the normal forwarding procedure may involve sending packet 302 (not a defined packet type packet 314) to an SDN controller. In other examples, the normal forwarding procedure may involve sending packet 302 (not a defined packet type packet 314) to a network switch or router. For instance, if the defined packet type is a packet characteristic indicative of a security risk, packets that do not indicate such a security risk (i.e., not a defined packet type packet 314) may be routed through the network according to the normal forwarding procedure to their intended destination. Similarly, if the defined packet type is a DNS request, packets that are not DNS requests may likewise be routed through the network according to the normal forwarding procedure to their intended destination.

Sending a packet via a normal forwarding procedure may further involve sending a packet to a forwarding engine within the network device to determine where the packet should be sent. In some examples, based on information from other components such as the Bloom filter or processing resource, the forwarding engine may forward the packet to an SDN controller, a network switch, a router, or the like.

Based (at least in part) on a determination that packet 302 is a defined packet type, filter 310 may forward or send the packet (depicted as defined packet type packet 312 for clarity) to Bloom filter 320. Bloom filter 320 receives packet 302 (D defined packet type packet 312) from filter 310, as described above in relation to Bloom filter 120 of FIG. 1. Like Bloom filter 120, Bloom filter 320 examines packet 302 (defined packet type packet 312) to determine whether it is a matched packet or an unmatched packet.

Based (at least in part) on a determination that packet 302 (defined packet type 312) is an unmatched packet, Bloom filter 320 may drop packet 302 (depicted as unmatched packet 324 for clarity). Dropping packet 302 (unmatched packet 324) may involve not sending the packet to its intended destination, as evidenced in its destination address. In some examples, dropping packet 302 (unmatched packet 324) may further involve responding to the sender of packet 302 with an error message. For instance, if packet 302 is a DNS request that is an unmatched packet, dropping the packet may involve responding to the sender with a non-existent domain (NXDOMAIN) message to indicate that the domain is invalid. In other such examples, dropping the packet may involve redirecting the packet to an administrator-defined remediation webserver IP address that serves up a "Restricted Access" webpage.

Bloom filter 320 may have compared packet 302 against a whitelist of domains such that any misses (i.e., unmatched packets) are dropped. In other examples, Bloom filter 320 may have compared packet 302 against a whitelist of IP addresses or the like such that any unmatched packets are dropped. As described above, Bloom filter 320 may receive the list from an SDN controller. In some examples, the whitelist may be a complete whitelist of domains, IP addresses, or the like. In other examples, the whitelist may be a partial whitelist of domains, IP addresses, or the like.

Based (at least in part) on a determination that packet 302 (defined packet type 312) is a matched packet, Bloom filter 320 may forward or send packet 302 (depicted as matched packet 322 for clarity) to processing resource 330. Processing resource 330 receives packet 302 (matched packet 322) from Bloom filter 320, as described above in relation to processing resource 130 of FIG. 1. Processing resource 330 examines the packet to determine whether the packet is an exact match, as described above in relation to processing resource 130 of FIG. 1. In some examples, processing resource 330 may use a look-up table to validate or invalidate matched packet 322 as an exact match. In other examples, processing resource 330 may validate or invalidate matched packet 322 as an exact match using hardcoded logic to compare matched packet 322 against a list, as described above.

Based (at least in part) on a determination that packet 302 (matched packet 322) is not an exact match, processing resource 330 may drop packet 302 (depicted as no exact match packet 334 for clarity). As described above, dropping packet 302 (no exact match packet 334) may involve not sending the packet to its intended destination, as evidenced in its destination address. In other examples, dropping packet 302 (no exact match packet 334) may involve sending an error message to the sender of packet 302 or otherwise notifying the sender that the packet has not been sent to its intended destination. In an example in which the defined packet type is a DNS request, processing resource 330 may have compared packet 302 against a whitelist of domains.

Based (at least in part) on a determination that packet 302 (matched packet 322) is an exact match, processing resource 330 may forward or send packet 302 (depicted as exact match packet 332 for clarity) according to a normal forwarding procedure. As described above, in some such examples, the normal forwarding procedure may involve sending packet 302 (exact match packet 332) to an SDN controller. In other examples, the normal forwarding procedure may involve sending packet 302 (exact match packet 332) to a network switch or router. In yet other examples in which the defined packet type is a DNS request, the normal forwarding procedure may involve sending packet 302 (exact match packet 332) to a DNS server to resolve the request. In some examples, the implementation of network device 300 described herein may be employed in relation to any of FIGS. 1-2 and 4-6.

Figure 4:
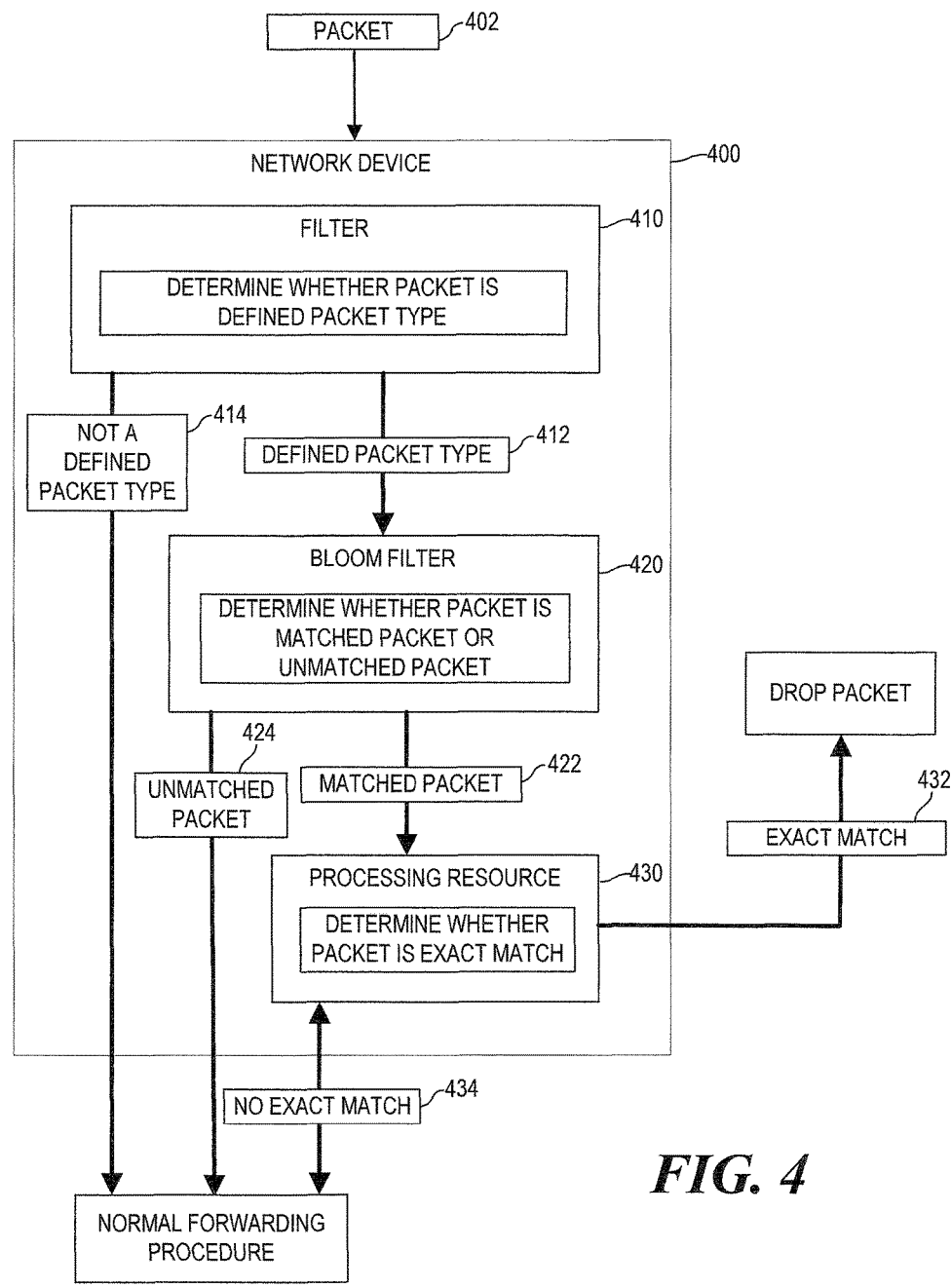
FIG. 4 is a block diagram of an example network device including a filter, Bloom filter, and processing resource that determines whether a matched packet is an exact match and drops the exact match.

FIG. 4 illustrates an example network device 400, comprising filter 410, Bloom filter 420, and processing resource 430, to filter a packet 402 for a packet type and that implement a blacklist functionality. Although FIG. 4 is described with reference to FIG. 1, other systems can be utilized (e.g., system 500 of FIG. 5A, described below).

In the example of FIG. 4, packet 402 may be received at filter 410, as described above in relation to packet 102 and filter 110 of FIG. 1. Filter 410 receives packet 402 and examines packet 402 to determine whether it is a defined packet type. As described above in relation to filter 110 of FIG. 1, filter 410 may comprise a TCAM filter, a look-up table, a hash table, or other suitable structure to determine whether packet 402 is a defined packet type.

Based (at least in part) on a determination that packet 402 is not a defined packet type, filter 410 may forward or send the packet (depicted as not a defined packet type packet 414) according to a normal forwarding procedure. In some such examples, the normal forwarding procedure may involve sending packet 402 (not a defined packet type packet 414) to an SDN controller. In other examples, the normal forwarding procedure may involve sending packet 402 (not a defined packet type packet 414) to a network switch or router. For instance, if the defined packet type is a packet characteristic indicative of a security risk, packets that do not indicate such a security risk (i.e., not a defined packet type packet 414) may be routed through the network according to the normal forwarding procedure to their intended destination. Similarly, if the defined packet type is a DNS request, packets that are not DNS requests may likewise be routed through the network according to the normal forwarding procedure to their intended destination.

Based (at least in part) on a determination that packet 402 is a defined packet type, filter 410 may forward or send the packet (depicted as defined packet type packet 412 for clarity) to Bloom filter 420. Bloom filter 420 receives packet 402 (defined packet type packet 412) from filter 410, as described above in relation to Bloom filter 120 of FIG. 1. Like Bloom filter 120, Bloom filter 420 examines packet 402 (defined packet type packet 412) to determine whether it is a matched packet or an unmatched packet.

Based (at least in part) on a determination that packet 402 (defined packet type 412) is an unmatched packet, Bloom filter 420 may forward or send packet 402 (depicted as unmatched packet 424 for clarity) according to a normal forwarding procedure. As described above, in some such examples, the normal forwarding procedure may involve sending packet 402 (unmatched packet 424) to an SDN controller. In other examples, the normal forwarding procedure may involve sending packet 402 (unmatched packet 424) to a network switch or router. In yet other examples in which the defined packet type is a DNS request, the normal forwarding procedure may involve sending packet 402 (unmatched packet 424) to a DNS server to resolve the request.

Bloom filter 420 may have compared packet 402 against a blacklist of domains such that any misses (i.e., unmatched packets) are forwarded for resolution. In other such examples, Bloom filter 420 may have compared packet 402 against a blacklist of IP addresses or the like such that any unmatched packets are forwarded according to a normal forwarding procedure. As described above, Bloom filter 420 may receive the list from an SDN controller. In some examples, the blacklist may be a complete blacklist of domains, IP addresses, or the like. In other examples, the blacklist may be a partial blacklist of domains, IP addresses, or the like.

Based (at least in part) on a determination that packet 402 (defined packet type 412) is a matched packet, Bloom filter 420 may forward or send packet 402 (depicted as matched packet 422 for clarity) to processing resource 430. Processing resource 430 receives packet 402 (matched packet 422) from Bloom filter 420, as described above in relation to processing resource 130 of FIG. 1. Processing resource 430 examines the packet to determine whether the packet is an exact match, as described above in relation to processing resource 130 of FIG. 1. In some examples, processing resource 330 may use a look-up table to validate or invalidate matched packet 422 as an exact match. In other examples, processing resource 430 may validate or invalidate matched packet 422 as an exact match using hardcoded logic to compare matched packet 422 against a list, as described above.

Based (at least in part) on a determination that packet 302 (matched packet 322) is not an exact match, processing resource 330 may forward or send packet 402 (depicted as no exact match packet 434 for clarity) according to a normal forwarding procedure. As described above, in some such examples, the normal forwarding procedure may involve sending packet 402 (no exact match packet 434) to an SDN controller. In other examples, the normal forwarding procedure may involve sending packet 402 (no exact match packet 434) to a network switch or router. In yet other examples in which the defined packet type is a DNS request, the normal forwarding procedure may involve sending packet 402 (no exact match packet 434) to a DNS server to resolve the request. In such examples, processing resource 430 may have compared packet 402 against a blacklist of domains such that packets that are not exact matches are forwarded for resolution.

Based (at least in part) on a determination that packet 402 (matched packet 422) is an exact match, processing resource 430 may drop packet 402 (depicted as exact match packet 432 for clarity). Dropping packet 402 (exact match packet 432) may involve not sending the packet to its intended destination, as evidenced by its destination address. In some examples, dropping packet 402 (exact match packet 432) may further involve responding to the sender of packet 402 with an error message. For instance, if packet 402 is a DNS request, dropping the packet may involve responding to the sender with a non-existent domain (NXDOMAIN) message to indicate that the domain is invalid. In other such examples, dropping the packet may involve responding with an administrator-defined remediation webserver IP address that serves up a "Restricted Access" webpage. In such examples, processing resource 430 may have compared packet 402 against a blacklist of domains such that any packets that match a domain on the list are dropped. In some examples, the implementation of network device 400 described herein may be employed in relation to any of FIGS. 1-3 and 5-6.

Figure 5A:
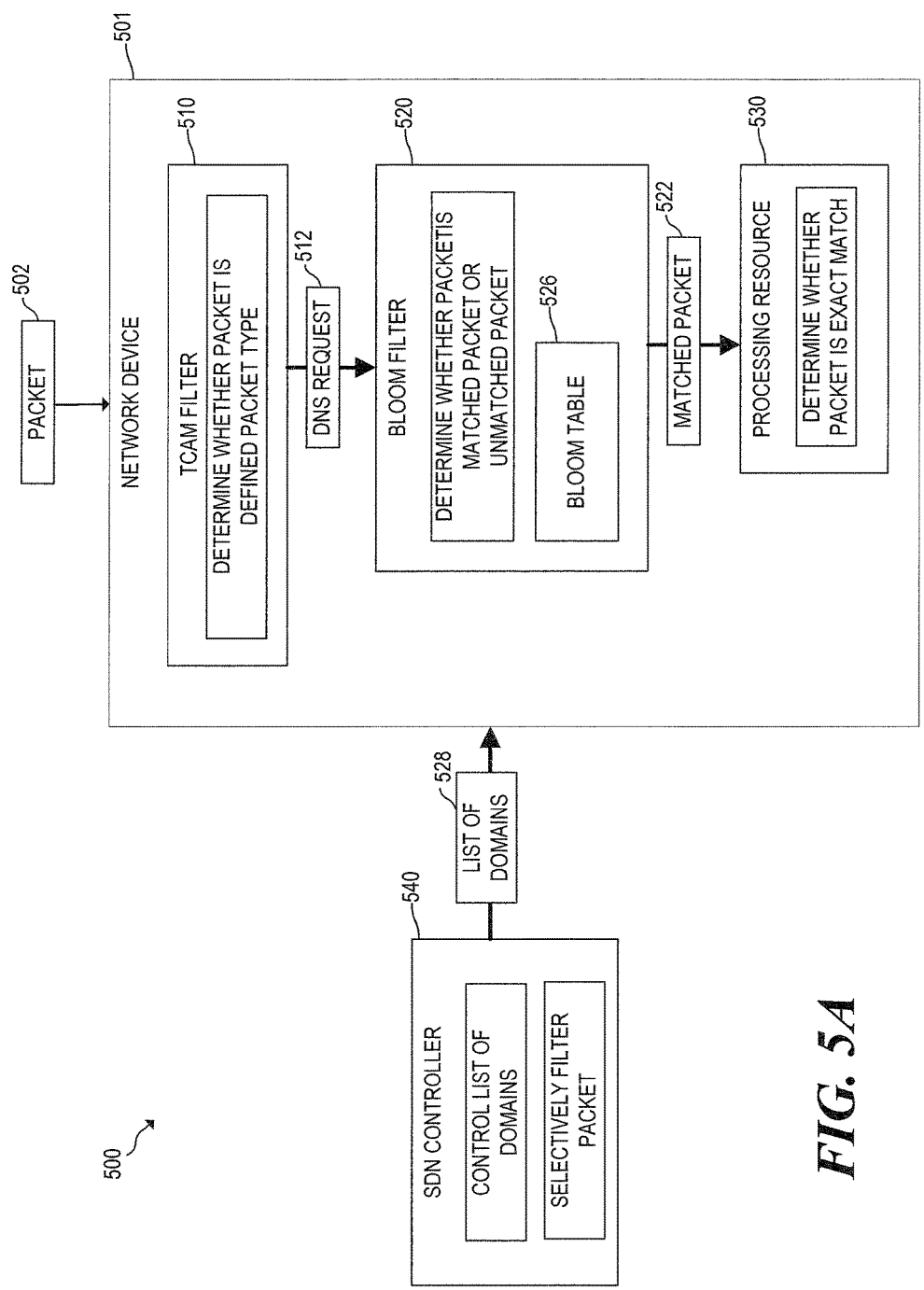
FIG. 5A is a block diagram of example system including an SDN controller and a network device to filter a packet.

FIG. 5A illustrates an example system 500 to filter a packet that comprises an SDN controller 540 and a network device 501. As described above, an SDN controller may refer to an application at the core of an SDN network located between network devices and applications that manages communications across the network. In some examples, SDN controller 540 may control a list of domains such as a blacklist of domains, a whitelist of domains, and/or a monitor list of domains. SDN controller may manage and update the lists and may also send one or more of the lists to network device 501. Sending the list of domains may involve sending one of several lists to network device 501 or may involve sending a portion of a list to network device 501.

SDN controller 540 may also selectively filter packets. In some examples, for instance those in which a partial or incomplete list of domains was sent to network device 501, some packets may be sent to SDN controller 540 from network device 501 for further filtering against a complete list of domains. In such examples, selectively filtering a packet may involve comparing the packet against the complete list of domains via a filter, a table look-up, hash look-up, and the like. In some examples, SDN controller 540 may fetch, decode, and execute instructions stored on a storage medium to selectively filter the packet. In such examples, selectively filtering the packet may be implemented in the form of electronic circuitry, executable instructions encoded on a machine-readable storage medium, or a combination thereof.

Network device 501 comprises TCAM filter 510, Bloom filter 520, and processing resource 530 to filter a packet 502 for a packet type. As described above, network device 501 may be a switch, router, or access point in some examples. Network device 501 may also be an edge device. In addition, network device 501 receives a list of domains 528 from SDN controller 540.

In some examples, list of domains 528 may be a partial list of domains 528. The partial list may include the most critical domains, a number of domains that may be most easily managed by Bloom filter 520, or a subset of the most critical domains. In such examples, packets may be forwarded to SDN controller 540 for a complete determination as to whether the packet is requesting access to a domain on the list of domains. In other such examples, SDN controller 540 may send a portion of the list of domains to multiple network devices. Depending on whether Bloom filter 520 and/or processing resource 530 determine a match, network device 501 may send packet 502 to a next network device having a different portion of the list of domains until the packet has been compared against the complete list of domains.

In some examples, upon receiving the list of domains 528, network device 501 may store the list of domains 528 at a location accessible by Bloom filter 520 and processing resource 530 of network device 501. In other examples, Bloom filter 520 and/or processing resource 530 of network device 501 may process and store the list of domains 528 individually.

In the example of FIG. 5A, packet 502 may be received at TCAM filter 510, as described above in relation to packet 202 and filter 210 of FIG. 2. TCAM filter 510 receives packet 502 and examines packet 502 to determine whether it is a defined packet type. The defined packet type may be a DNS request. As described above in relation to filter 210 of FIG. 2, TCAM filter 510 determines whether packet 502 is a DNS request. In some examples, TCAM filter 510 may first determine whether packet 502 is an Internet Protocol (IP) packet. If packet 502 is an IP packet, TCAM filter 510 may determine if packet 502 was sent via the User Datagram Protocol (UDP) or the Transmission Control Protocol (TCP) and if so, determine whether packet 502 was sent to a destination port number associated with DNS. If so, TCAM filter 510 may determine whether packet 502 is a DNS request by examining DNS header fields. Based (at least in part) on a determination that packet 502 is a DNS request, TCAM filter 510 may forward or send the packet (depicted as DNS request packet 512 for clarity) to Bloom filter 520.

Bloom filter 520 receives packet 502 (DNS request 512) from TCAM filter 510, as described above in relation to Bloom filter 220 of FIG. 2. Bloom filter 520 examines packet 502 (DNS request 512) to determine whether it is a matched packet or an unmatched packet. As shown in the example of FIG. 5A, Bloom filter 520 may comprise a Bloom table 526. Bloom table 526 may receive a list of domains 528, hash each item in the list, and store each item as an entry in Bloom table 526, as described above in relation to Bloom table 226 of FIG. 2. Bloom filter 520, as described above in relation to Bloom filter 220 of FIG. 2, may compare packet 502 (DNS request packet 512) against the list of domains in Bloom table 526 and determine whether packet 502 (DNS request 512) is a matched packet or an unmatched packet.

Based (at least in part) on a determination that packet 202 (DNS request 212) is a matched packet, Bloom filter 220 may forward or send packet 202 (depicted as matched packet 222 for clarity) to processing resource 230. Processing resource 230 receives packet 202 from Bloom filter 220, as described above in relation to processing resource 130 of FIG. 1.

Based (at least in part) on the determination that packet 502 is a matched packet, processing resource 530 receives packet 502 (matched packet 522) from Bloom filter 520 and examines the packet to determine whether the packet is an exact match, as described above in relation to processing resource 230 of FIG. 2. In some examples, processing resource 530 may use a look-up table to validate or invalidate matched packet 522 as an exact match. In other examples, processing resource 530 may validate or invalidate matched packet 522 as an exact match using hardcoded logic to compare matched packet 522 against a list.

In some examples, as described above, processing resource 530 may receive and store the list of domains 528 from SDN controller 540. In other examples, processing resource 530 may access the list of domains 528 at another location. Processing resource 530 may compare packet 502 (matched packet 522) against the list of domains 528 to determine if the packet is an exact match. For instance, processing resource 530 may compare matched packet 522 (i.e., the DNS request packet 512) against the list to determine if the packet is requesting access to any of the domains in the list of domains.

Based (at least in part) on a determination that packet 502 (matched packet 522) is an exact match or is not an exact match, and based on whether the list of domains 528 is a blacklist, a whitelist, or a monitor list, processing resource 530 may forward the packet according to a normal forwarding procedure, drop the packet, or take some other like action, as described in relation to FIGS. 1-4 and 6. In some examples, the implementation of system 500 described herein may be employed in relation to any of FIGS. 1-4 and 6.

Figure 5B:
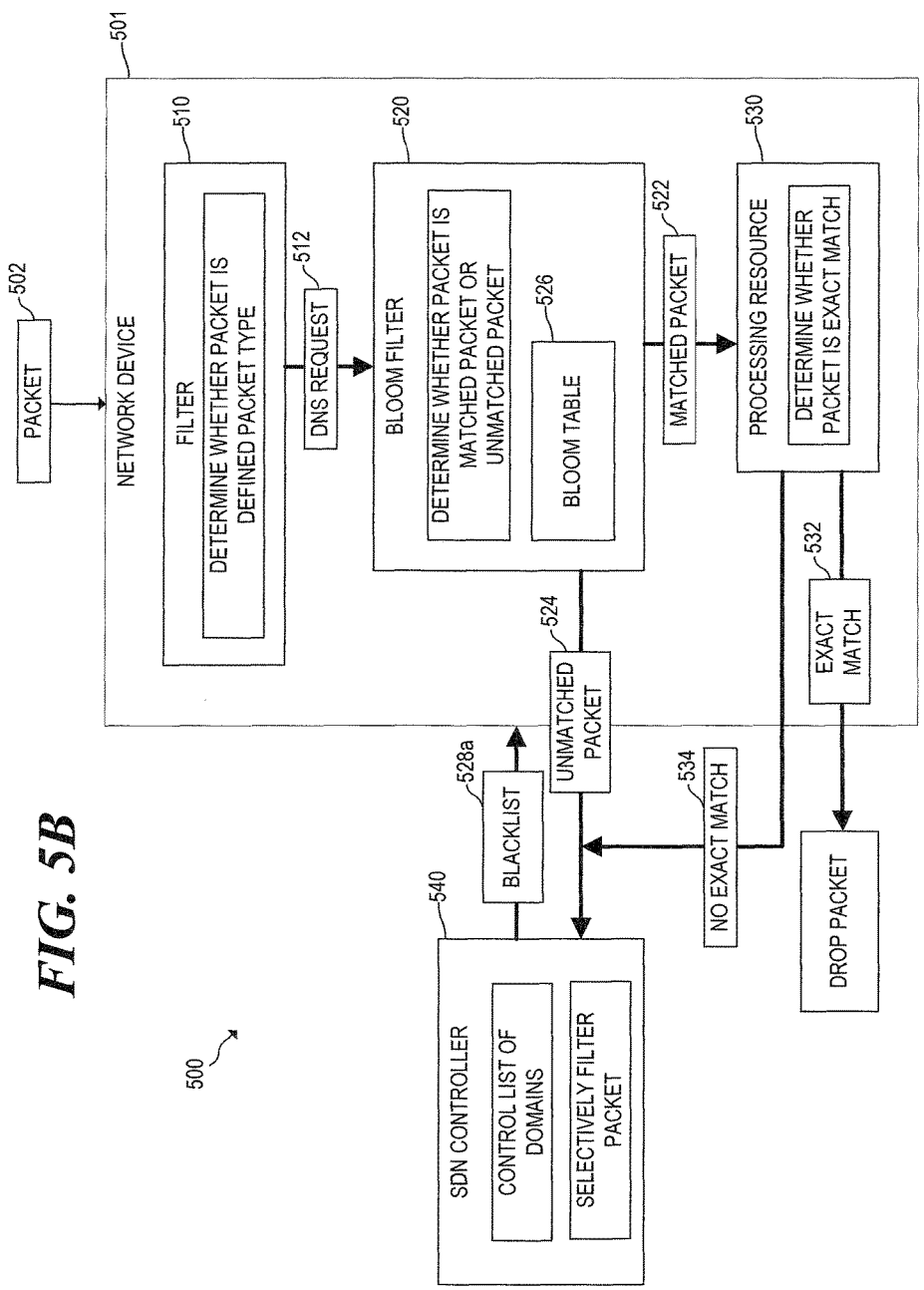
FIG. 5B is a block diagram of example system including an SDN controller and a network device in which the SDN controller sends a blacklist of domains to a Bloom table of a Bloom filter in the network device.

In the example of FIG. 5B, SDN controller 540 may control a blacklist of domains 528a. SDN controller 540 may forward or send the blacklist of domains 528a to network device 501. Sending the blacklist of domains 528a may involve sending the complete blacklist of domains 528a or a portion of the blacklist of domains 528a. Network device 501 receives the blacklist of domains 528a. In some examples, Bloom table 526 may receive the blacklist of domains 528a, hash each item in the list, and store each item as an entry in Bloom table 526, as described above in relation to Bloom table 226 of FIG. 2. Bloom filter 520, as described above, may compare packet 502 (DNS request packet 512) against the blacklist of domains 528a in Bloom table 526 and determine whether packet 502 (DNS request 512) is a matched packet or an unmatched packet.

Based (at least in part) on a determination that packet 502 is an unmatched packet, Bloom filter 520 may send packet 502 (depicted as unmatched packet 524 for clarity) to SDN controller 540. In such examples, SDN controller may selectively filter packet 502 (unmatched packet 524) against another list or lists of domains such as a monitor list of domains, a complete blacklist of domains, a whitelist of domains and the like. Based on selectively filtering packet 502 (unmatched packet 524), SDN controller 540 may drop packet 502, forward packet 502 for resolution, monitor or track a requested access to a domain associated with packet 502, and the like. If, for instance, packet 502 includes a domain that is present in a complete blacklist of domains controlled by SDN controller 540, SDN controller 540 may drop the packet. If, on the other hand, packet 502 does not include a domain present in a complete blacklist of domains controlled by SDN controller 540, SDN controller 540 may forward packet 502 according to a normal forwarding procedure to resolve the DNS request.

As described above, based (at least in part) on the determination that packet 502 is a matched packet, processing resource 530 receives packet 502 (matched packet 522) from Bloom filter 520 and examines the packet to determine whether the packet is an exact match. In some examples, processing resource 530 may access the blacklist of domains 528a and may use a look-up table, hardcoded logic, or the like to validate or invalidate matched packet 522 as an exact match.

Based (at least in part) on a determination that packet 502 (matched packet 522) is not an exact match, processing resource 530 may forward packet 502 (depicted as no exact match packet 534 for clarity) to SDN controller 540. In such examples, SDN controller may selectively filter packet 502 (no exact match packet 534) against another list or lists of domains such as a monitor list of domains, a complete blacklist of domains, a whitelist of domains and the like. Based on selectively filtering packet 502 (no exact match packet 534), SDN controller 540 may drop packet 502, forward packet 502 for resolution, monitor or track a requested access to a domain associated with packet 502, and the like. If, for instance, packet 502 includes a domain that is present in a complete blacklist of domains controlled by SDN controller 540, SDN controller 540 may drop the packet. If, on the other hand, packet 502 does not include a domain present in a complete blacklist of domains controlled by SDN controller 540, SDN controller 540 may forward packet 502 according to a normal forwarding procedure to resolve the DNS request.

Based (at least in part) on a determination that packet 502 (matched packet 522) is an exact match, processing resource 530 may drop packet 502 (depicted as exact match packet 532 for clarity). Dropping packet 502 (exact match packet 532) may involve not sending the packet to its intended destination, as evidenced by its destination address. In some examples, dropping packet 502 (exact match packet 532) may further involve responding to the sender of packet 502 with an error message. For instance, if packet 502 is a DNS request that is an unmatched packet, dropping the packet may involve responding to the sender with a non-existent domain (NXDOMAIN) message to indicate that the domain is invalid. In other such examples, dropping the packet may involve responding with an administrator-defined remediation webserver IP address that serves up a "Restricted Access" webpage. In some examples, the implementation of system 500 as described in FIG. 5B may be employed in relation to any of FIGS. 1-3 and 6.

Figure 5C:
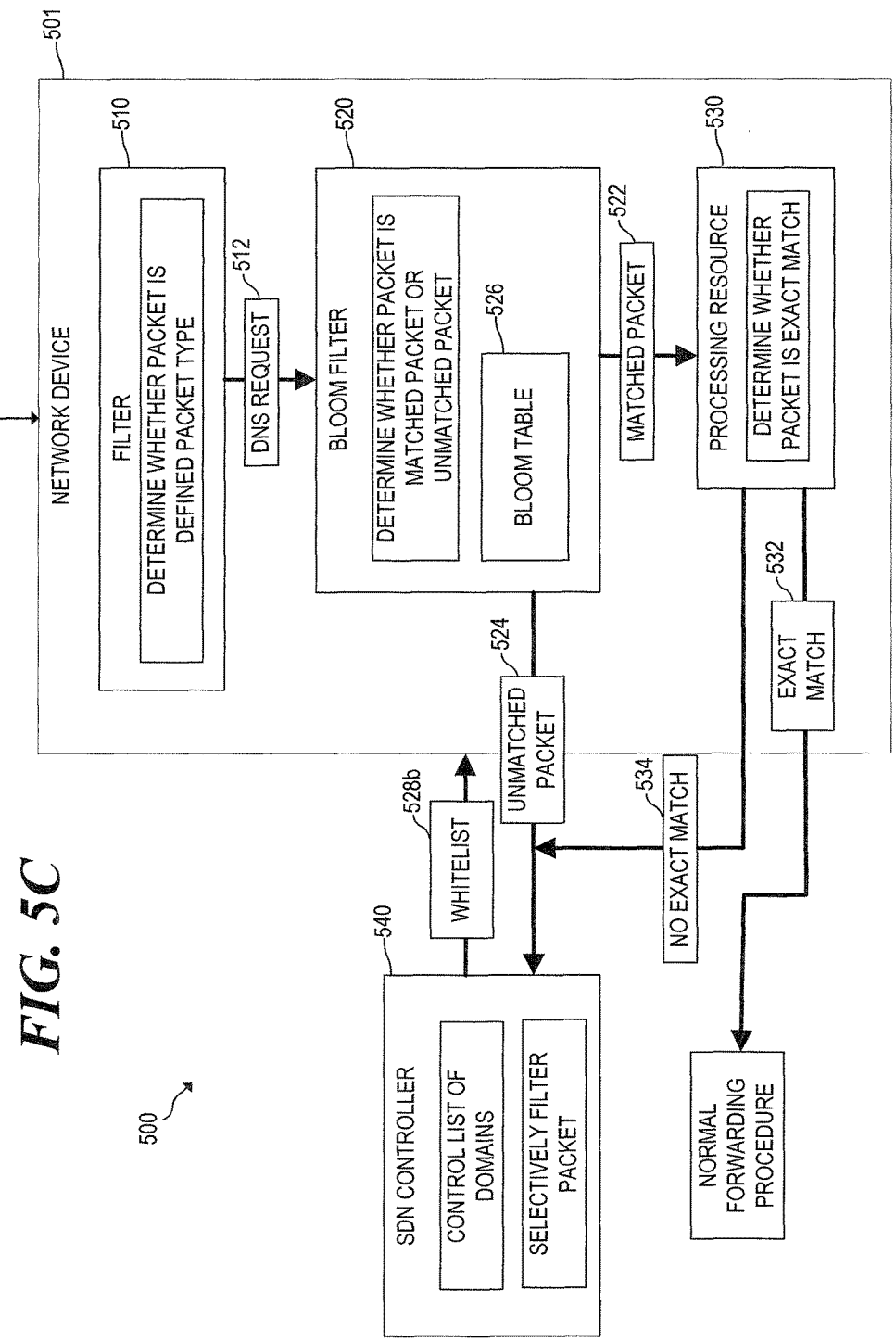
FIG. 5C is a block diagram of example system including an SDN controller and a network device in which the SDN controller sends a whitelist of domains to a Bloom table of a Bloom filter in the network device.

In the example of FIG. 5C, SDN controller 540 may control a whitelist of domains 528b. SDN controller 540 may forward or send the whitelist of domains 528b to network device 501. Sending the whitelist of domains 528b may involve sending the complete whitelist of domains 528b or a portion of the whitelist of domains 528b. Network device 501 receives the whitelist of domains 528b. In some examples, Bloom table 526 may receive the whitelist of domains 528b, hash each item in the list, and store each item as an entry in Bloom table 526, as described above. Bloom filter 520, as described above, may compare packet 502 (DNS request packet 512) against the whitelist of domains 528b in Bloom table 526 and determine whether packet 502 (DNS request 512) is a matched packet or an unmatched packet.

Based (at least in part) on a determination that packet 502 is an unmatched packet, Bloom filter 520 may send packet 502 (depicted as unmatched packet 524 for clarity) to SDN controller 540. In such examples, SDN controller may selectively filter packet 502 (unmatched packet 524) against another list or lists of domains such as a monitor list of domains, a complete whitelist of domains, a blacklist of domains and the like. Based on selectively filtering packet 502 (unmatched packet 524), SDN controller 540 may drop packet 502, forward packet 502 for resolution, monitor or track a requested access to a domain associated with packet 502, and the like. If, for instance, packet 502 includes a domain that is present in a complete whitelist of domains controlled by SDN controller 540, SDN controller 540 may forward packet 502 according to a normal forwarding procedure to resolve the DNS request. If, on the other hand, packet 502 does not include a domain present in a complete whitelist of domains controlled by SDN controller 540, SDN controller 540 may drop the packet.

As described above, based (at least in part) on the determination that packet 502 is a matched packet, processing resource 530 receives packet 502 (matched packet 522) from Bloom filter 520 and examines the packet to determine whether the packet is an exact match. In some examples, processing resource 530 may access the whitelist of domains 528b and may use a look-up table, hardcoded logic, or the like to validate or invalidate matched packet 522 as an exact match.

Based (at least in part) on a determination that packet 502 (matched packet 522) is not an exact match, processing resource 530 may forward packet 502 (depicted as no exact match packet 534 for clarity) to SDN controller 540. In such examples, SDN controller may selectively filter packet 502 (no exact match packet 534) against another list or lists of domains such as a monitor list of domains, a complete whitelist of domains, a blacklist of domains and the like. Based on selectively filtering packet 502 (no exact match packet 534), SDN controller 540 may drop packet 502, forward packet 502 for resolution, monitor or track a requested access to a domain associated with packet 502, and the like. If, for instance, packet 502 includes a domain that is present in a complete whitelist of domains controlled by SDN controller 540, SDN controller 540 may forward packet 502 according to a normal forwarding procedure to resolve the DNS request. If, on the other hand, packet 502 does not include a domain present in a complete whitelist of domains controlled by SDN controller 540, SDN controller 540 may drop the packet.

Based (at least in part) on a determination that packet 502 (matched packet 522) is an exact match, processing resource 530 may forward packet 502 (depicted as exact match packet 532 for clarity) according to a normal forwarding procedure. In some examples, forwarding packet 502 according to a normal forwarding procedure involve forwarding the packet to SDN controller 540. In other examples, forwarding packet 502 according to a normal forwarding procedure may involve forwarding the packet to a DNS server to resolve the DNS request. In yet other examples, forwarding packet 502 may involve sending the packet to a network switch or router. In some examples, the implementation of system 500 as described in FIG. 5C may be employed in relation to any of FIGS. 1-3 and 6.

Figure 6A:
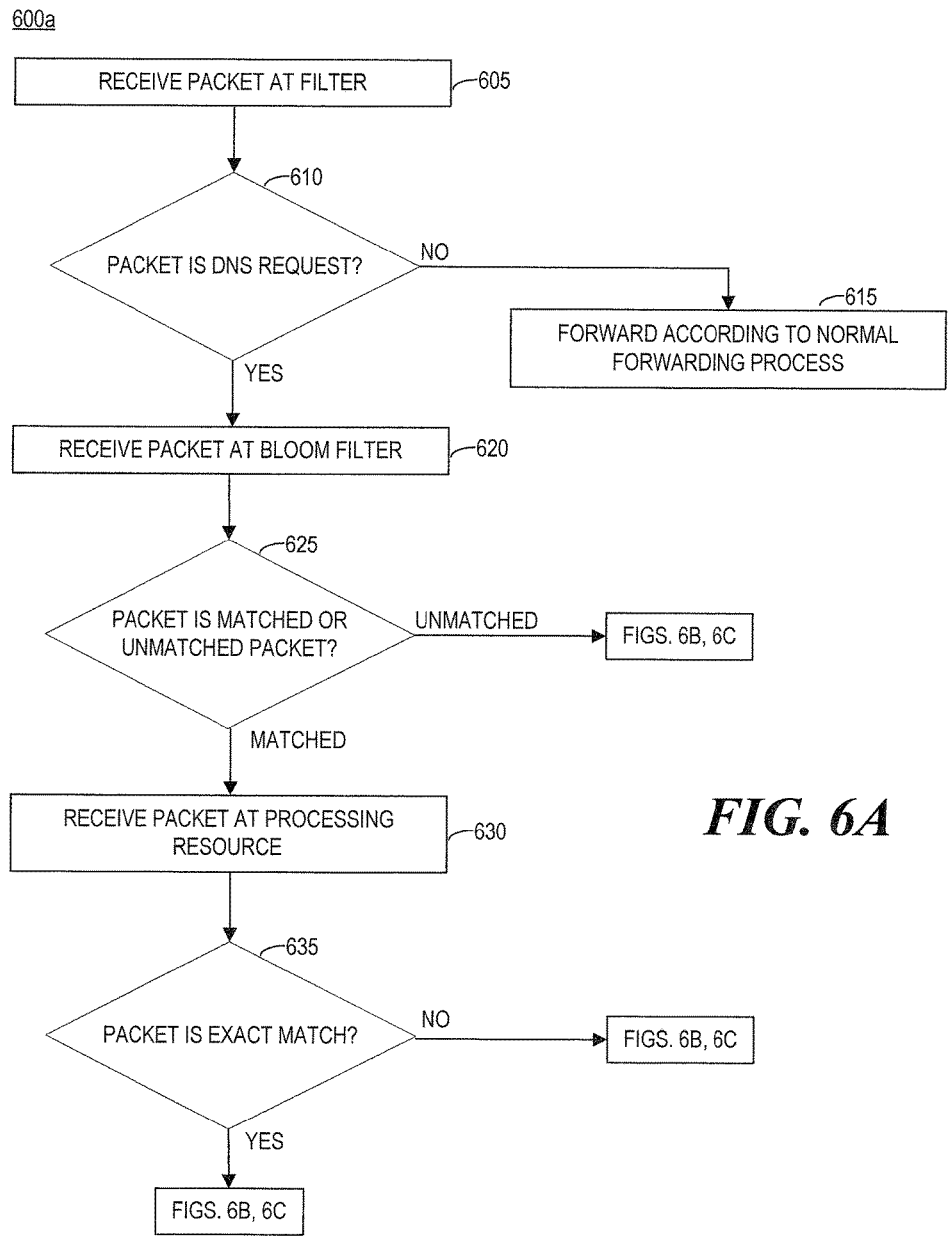
FIG. 6A is a flow chart of an example method of filtering a packet for a packet type at a network device including determining whether the packet is a DNS request, determining whether the DNS request is a matched packet, and determining whether the matched packet is an exact match.

Further examples are described herein in relation to FIG. 6A, which is a flowchart of an example method 600a of filtering a packet for a packet type at a network device. Although execution of method 600a is described below with reference to network device 200 of FIG. 2, other suitable network devices for the execution of method 600a can be utilized (e.g., network device 501 in system 500 of FIG. 5). Additionally, implementation of method 600a is not limited to such examples.

In the example of FIG. 6A, method 600a may be a method of network device 200. As described above in relation to FIG. 2, network device 200 may comprise filter 210, Bloom filter 220, and processing resource 230. At 605, filter 210 of network device 200 may receive packet 202. This receipt may be performed as discussed above in relation to FIG. 2. At 610, filter 210 may examine packet 202 to determine whether it is a defined packet type, as described above in relation to filter 210 of FIG. 2. The defined packet type may be a DNS request. Based (at least in part) on a determination that packet 202 is not a DNS request, method 600a proceeds to 615. At 615, filter 210 may forward or send the packet according to a normal forwarding procedure. In some examples, the packet may be sent to an SDN controller, a network switch or router, or the like.

Based (at least in part) on a determination that packet 202 is a DNS request, method 600a proceeds to 620. At 620, filter 210 sends the packet (DNS request packet 212) to Bloom filter 220, which receives the packet, as described above in relation to Bloom filter 220 of FIG. 2. As described above in relation to FIG. 2, at 625, Bloom filter 220 determines whether packet 202 (DNS request packet 212) is a matched packet or an unmatched packet. In some examples, Bloom filter 220 compares packet 202 (DNS request packet 212) against a list of domains to determine whether the packet is a matched packet or an unmatched packet.

Based (at least in part) on a determination that packet 202 (DNS request packet 212) is an unmatched packet, method 600a may proceed per methods 600b or 600c of FIGS. 6B and 6C, respectively, described in more detail below. Based (at least in part) on a determination that packet 202 (DNS request packet) is a matched packet, method 600a proceeds to 630 and Bloom filter 220 forwards packet 202 (matched packet 222) to processing resource 230, as discussed above in relation to FIG. 2. At 630, processing resource 230 of network device 200 receives packet 202 from Bloom filter 220, as described above in relation to FIG. 2. At 635, processing resource 230 examines packet 202 (matched packet 222) to determine whether the packet is an exact match, as described above in relation to processing resource 230 of FIG. 2.

Based (at least in part) on a determination that packet 202 (matched packet 222) is an exact match or is not an exact match, processing resource may forward the packet according to a normal forwarding procedure, drop the packet, or take some other like action. For instance, based (at least in part) on the determination that packet 202 (matched packet 222) not an exact match, method 600a may proceed per methods 600b or 600c of FIGS. 6B and 6C, respectively. Likewise, based (at least in part) on the determination that packet 202 (matched packet 222) is an exact match, method 600a may proceed per methods 600b or 600c of FIGS. 6B and 6C, respectively.

Although the flowchart of FIG. 6A shows a specific order of performance of certain functionalities, method 600a is not limited to that order. For example, the functionalities shown in succession in the flowchart may be executed concurrently or with partial concurrence, or a combination thereof. In some examples, functionalities described herein in relation to FIG. 6A may be provided in combination with functionalities described herein in relation to any of FIGS. 1-5.

Figure 6B:
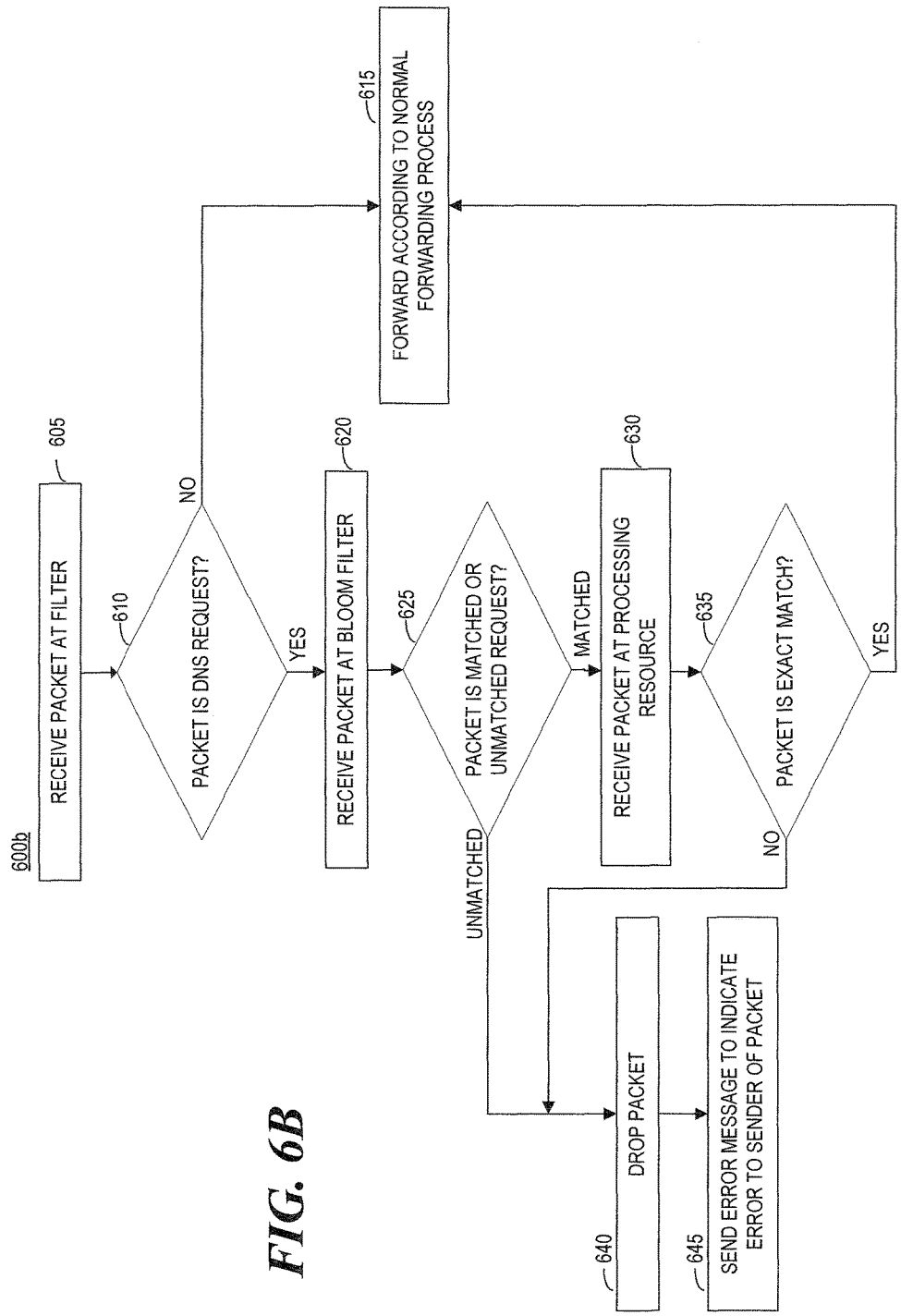
FIG. 6B is a flow chart of an example method of filtering a packet for a packet type at a network device including dropping unmatched packets and matched packets that are not exact matches.

FIG. 6B is a flowchart of an example method 600b of filtering a packet for a packet type at a network device that incorporates method 600a of FIG. 6A. To the extent that method 600b uses like numerals to those used in method 600a, those portions of method 600b may be understood with reference to method 600a. Execution of method 600b is described below with reference to network device 200 of FIG. 2 and network device 300 of FIG. 3, but other suitable network devices for the execution of method 600b can be utilized (e.g., network device 501 in system 500 of FIG. 5). Additionally, implementation of method 600b is not limited to such examples.

In the example of FIG. 6B, method 600b may be a method of network devices 200 and 300. At 625, as described above, Bloom filter 220 determines whether packet 202 (DNS request packet 212) is a matched packet or an unmatched packet. Similarly, Bloom filter 320 determines whether packet 302 is a matched packet or an unmatched packet, as described above in relation to Bloom filter 320 of FIG. 3.

Based (at least in part) on a determination that packet 302 (or packet 202) is an unmatched packet, method 600b proceeds to 640. At 640, packet 302 (unmatched packet 324) may be dropped, as described above in relation to FIG. 3. In some examples, Bloom filter 320 may drop packet 302. At 645, an error message may be sent to indicate an error to a sender of packet 202. In some examples, a non-existent domain (NXDOMAIN) message may be sent to indicate that the domain is invalid. In other examples, the error message may include an administrator-defined remediation web-server IP address that serves up a "Restricted Access" webpage.

Based (at least in part) on a determination that packet 302 (or packet 202) is a matched packet, method 600b proceeds to 630 and processing resource 230 receives the packet. At 635, as described above, processing resource 230 determines whether packet 202 (matched packet 222) is an exact match. Similarly, processing resource 330 determines whether packet 302 (matched packet 322) is an exact match, as described above in relation to processing resource 330 of FIG. 3. Based (at least in part) on a determination that packet 302 (matched packet 322) is not an exact match, method 600b proceeds to 640. As described above, at 640, packet 302 (no exact match packet 334) may be dropped, as described above in relation to FIG. 3. In some examples, processing resource 330 may drop packet 302. At 645, as described above, an error message may be sent to indicate an error to a sender of packet 202.

At 635, based (at least in part) on a determination that packet 302 (matched packet 322) is an exact match, method 600b proceeds to 615. As described above in relation to FIG. 6A, and as also described in relation to FIG. 3, at 615, packet 302 (exact match packet 332) may be forwarded according to a normal forwarding procedure. In some examples, the packet may be sent to an SDN controller, a network switch or router, or the like.

The remainder of the steps of FIG. 6B, steps 605, 610, 620, and 630, may be performed as described above in relation to method 600a of FIG. 6A. Although the flowchart of FIG. 6B shows a specific order of performance of certain functionalities, method 600b is not limited to that order. For example, the functionalities shown in succession in the flowchart may be executed concurrently or with partial concurrence, or a combination thereof. In some examples, functionalities described herein in relation to FIG. 6B may be provided in combination with functionalities described herein in relation to any of FIGS. 1-5.

Figure 6C:
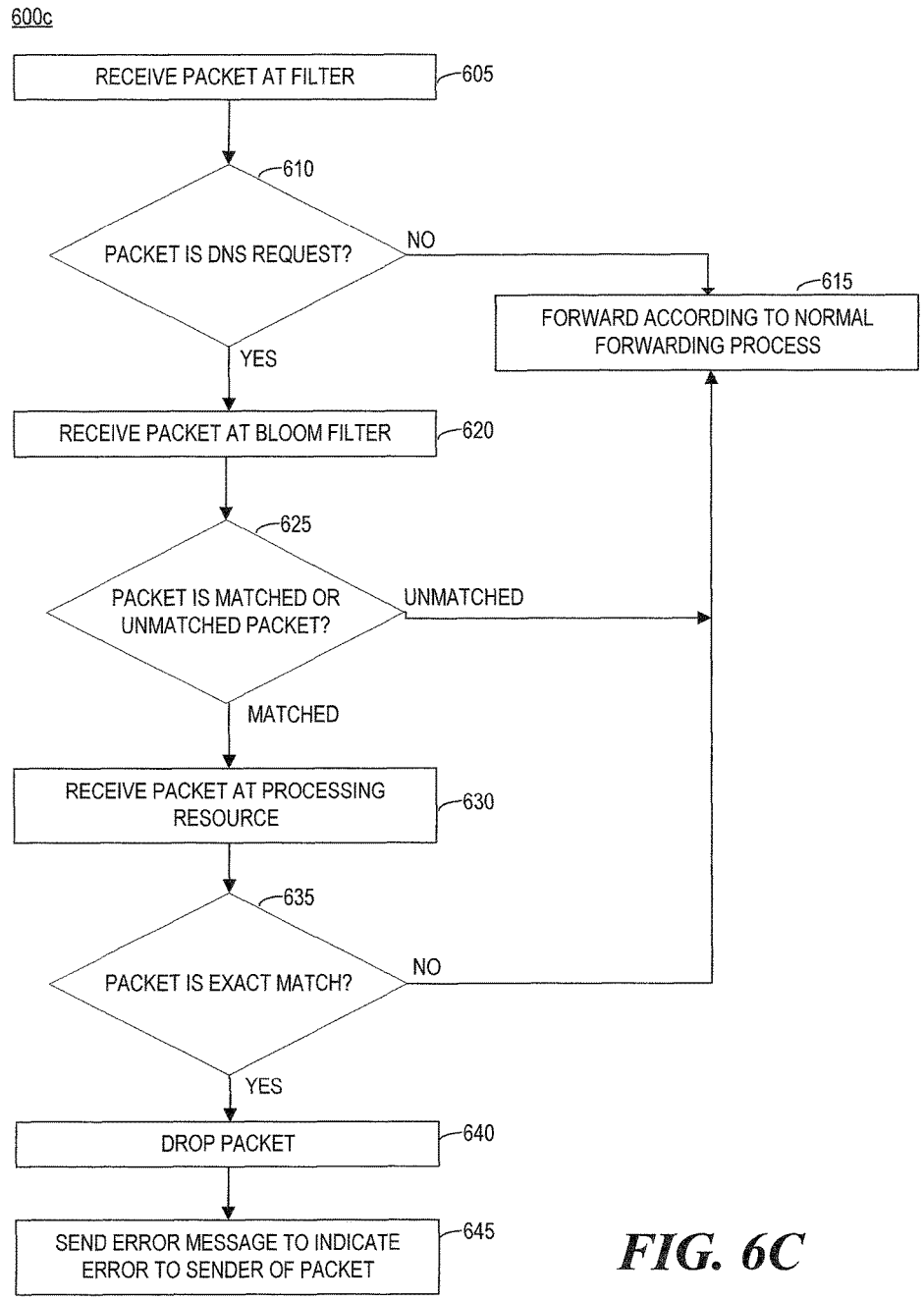
FIG. 6C is a flow chart of an example method of filtering a packet for a packet type at a network device including forwarding packets that are not DNS requests, unmatched packets, and matched packets that are not exact matches according to a normal forwarding procedure.

FIG. 6C is a flowchart of an example method 600c of filtering a packet for a packet type at a network device that incorporates method 600a of FIG. 6A. To the extent that method 600c uses like numerals to those used in method 600a, those portions of method 600c may be understood with reference to method 600a. Execution of method 600c is described below with reference to network device 200 of FIG. 2 and network device 400 of FIG. 4, but other suitable network devices for the execution of method 600c can be utilized (e.g., network device 501 in system 500 of FIG. 5). Additionally, implementation of method 600c is not limited to such examples.

In the example of FIG. 6C, method 600c may be a method of network devices 200 and 400. At 625, as described above, Bloom filter 220 determines whether packet 202 (DNS request packet 212) is a matched packet or an unmatched packet. Similarly, Bloom filter 420 determines whether packet 402 is a matched packet or an unmatched packet, as described above in relation to Bloom filter 420 of FIG. 4.

Based (at least in part) on a determination that packet 402 (or packet 202) is an unmatched packet, method 600c proceeds to 615. As described above in relation to FIG. 6A, and as also described in relation to FIG. 4, at 615, packet 402 (unmatched packet 424) may be forwarded according to a normal forwarding procedure. In some examples, the packet may be sent to an SDN controller, a network switch or router, or the like.

Based (at least in part) on a determination that packet 402 (or packet 202) is a matched packet, method 600c may proceed to 630 and 635. At 635, as described above, processing resource 230 determines whether packet 202 (matched packet 222) is an exact match. Similarly, processing resource 430 determines whether packet 402 (matched packet 422) is an exact match, as described above in relation to processing resource 430 of FIG. 4. In other examples, Bloom filter 420 may instead send packet 402 (matched packet 422) directly to an SDN controller for the SDN controller to verify whether the matched packet is an exact match. For example, a network security application, such as a reputation engine, may be executed by the SDN controller to perform this function. The SDN controller may drop the packet if it determines the matched packet is an exact match, or may return the packet to the network device to forward the packet according to a normal forwarding procedure if it determines the packet is not an exact match. In such examples, the network device may not need a processing resource to verify whether the matched packet is an exact match, since such function is performed by the SDN controller.

In yet other examples, high-trafficked blacklisted domains or IP addresses (e.g., domains or IP addresses that are appearing more commonly within traffic passing through the network device) may be handled by the network device's forwarding engine rather than relying on the Bloom filter 420 and a second-level check (e.g., by a processing resource or an SDN controller). For example, in an SDN-enabled packet processing pipeline within the forwarding engine, these high-trafficked blacklisted domains or IP addresses may be stored as flow table entries in a flow table within the forwarding engine along with an instruction to drop a packet if it matches the entry.

At 635, based (at least in part) on a determination that packet 402 (matched packet 422) is not an exact match, method 600c proceeds to 615. As described above, at 615, packet 402 (no exact match packet 434) may be forwarded according to a normal forwarding procedure. In some examples, the packet may be sent to an SDN controller, a network switch or router, or the like.

At 635, based (at least in part) on a determination that packet 402 (matched packet 422) is an exact match, method 600c proceeds to 640. At 640, packet 402 (unmatched packet 424) may be dropped, as described above in relation to FIG. 4. In some examples, Bloom filter 420 may drop packet 402. At 645, an error message may be sent to indicate an error to a sender of packet 402. In some examples, a non-existent domain (NXDOMAIN) message may be sent to indicate that the domain is invalid. In other examples, the error message may include an administrator-defined remediation webserver IP address that serves up a "Restricted Access" webpage.

The remainder of the steps of FIG. 6C, steps 605, 610, 620, and 630, may be performed as described above in relation to method 600a of FIG. 6A. Although the flowchart of FIG. 6C shows a specific order of performance of certain functionalities, method 600c is not limited to that order. For example, the functionalities shown in succession in the flowchart may be executed concurrently or with partial concurrence, or a combination thereof. In some examples, functionalities described herein in relation to FIG. 6C may be provided in combination with functionalities described herein in relation to any of FIGS. 1-5.

Figure 6D:
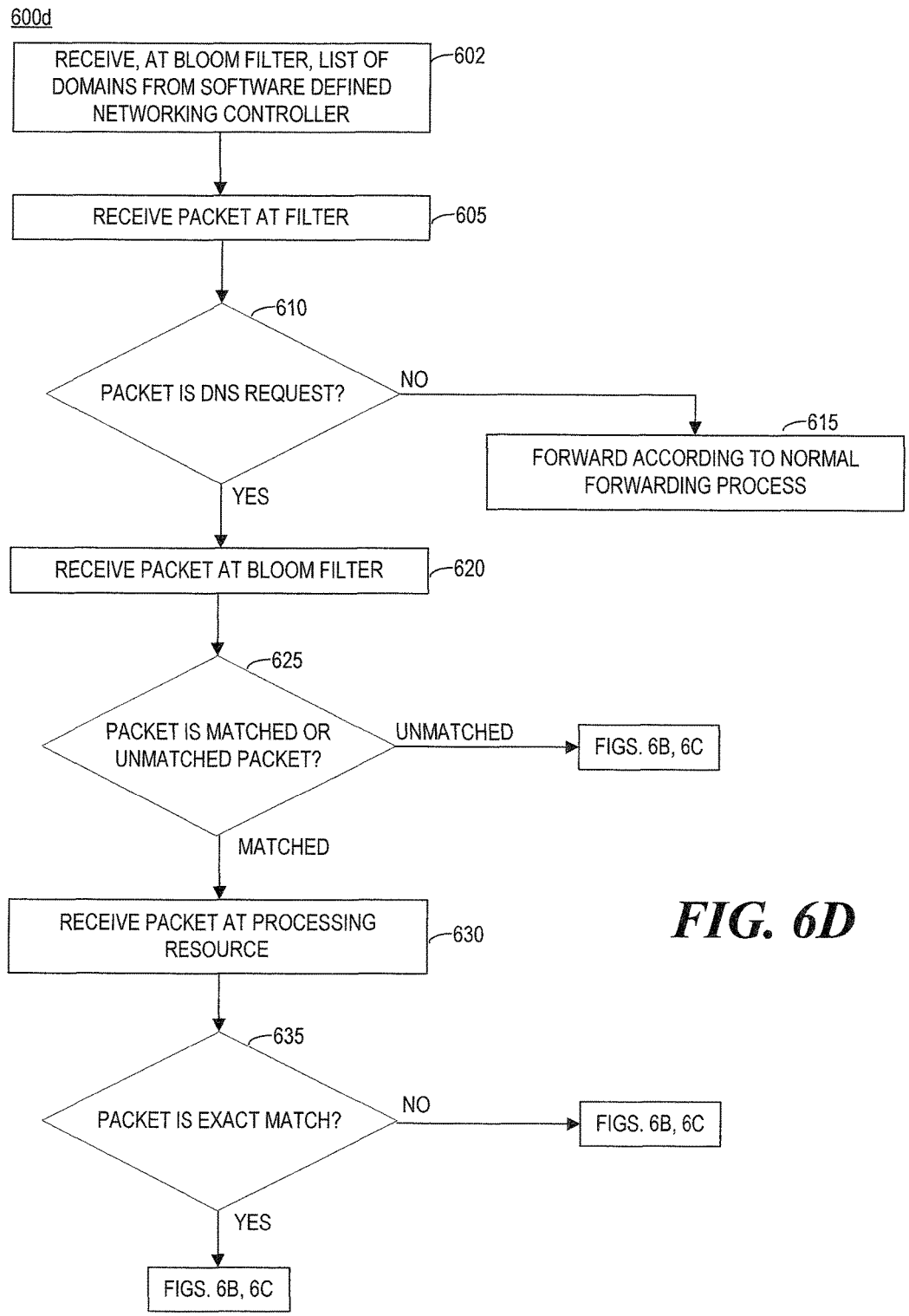
FIG. 6D is a flow chart of an example method of filtering a packet for a packet type at a network device including receiving, at a Bloom filter, a list of domains from an SDN controller.

FIG. 6D is a flowchart of an example method 600d of filtering a packet for a packet type at a network device that incorporates method 600a of FIG. 6A. To the extent that method 600d uses like numerals to those used in method 600a, those portions of method 600d may be understood with reference to method 600a. Execution of method 600d is described below with reference to network device 200 of FIG. 2, but other suitable network devices for the execution of method 600d can be utilized (e.g., network device 501 in system 500 of FIG. 5). Additionally, implementation of method 600d is not limited to such examples.

In the example of FIG. 6D, method 600d may be a method of network device 200. At 602, Bloom filter 220 may receive a list of domains 228 from SDN controller 240, hash each item in the list of domains, and store each item as an entry in Bloom table 226, as described above in relation to Bloom filter 220 of FIG. 2. The list of domains 228 may comprise a blacklist of domains, a whitelist of domains, or a monitor list of domains.

The remainder of the steps of FIG. 6D, steps 605, 610, 615, 620, 625, 630, and 635, may be performed as described above in relation to method 600a of FIG. 6A. Although the flowchart of FIG. 6D shows a specific order of performance of certain functionalities, method 600d is not limited to that order. For example, the functionalities shown in succession in the flowchart may be executed concurrently or with partial concurrence, or a combination thereof. In some examples, functionalities described herein in relation to FIG. 6D may be provided in combination with functionalities described herein in relation to any of FIGS. 1-5.

What is claimed is:

1. A network device to filter a packet for a packet type comprising:
    a filter to receive the packet and to determine whether the packet is a defined packet type;
    a Bloom filter to receive the packet from the filter based on the determination that the packet is a defined packet type and to determine whether the packet is a matched packet or an unmatched packet by comparing the packet against a list of domains comprising a blacklist of domains; and
    a processing resource to receive the packet from the Bloom filter based on the determination that the packet is a matched packet and to determine whether the packet is an exact match, wherein based on a determination that the packet is an exact match, the processing resource is to drop the packet and send an error message to indicate to a sender of the packet, and wherein based on a determination that the packet is an unmatched packet or based on a determination that the packet is not an exact match, the processing resource is to forward the packet to an SDN controller.

2. The network device of claim 1, wherein the network device is an edge device, a switch, a router, or a combination thereof.

3. The network device of claim 1, wherein the filter comprises a ternary content addressable memory (TCAM) filter, a look-up table, or hardcoded logic.

4. The network device of claim 1, wherein the defined packet type is a domain name service (DNS) request.

5. The network device of claim 1, wherein the Bloom filter is further to receive the list of domains from a software designed networking (SDN) controller and store the list of domains in a Bloom table.

6. The network device of claim 1, wherein the Bloom filter is to determine whether the packet is a matched packet or an unmatched packet b comparing the packet a list of domains comprising a white list domains and wherein the Bloom filter is further to drop the packet based on the determination that the packet is an unmatched packet.

7. The network device of claim 6, wherein the processing resource is further to, based on the determination that the packet is an exact match, forward the packet according to a normal forwarding procedure, and monitor each exact match.

8. The network device of claim 1, wherein the Bloom filter is further to, based on the determination that the packet is an unmatched packet, forward the packet according to a normal forwarding procedure.

9. The network device of claim 1, wherein the filter is further to forward the packet according to a normal forwarding procedure based on the determination that the packet is not a defined packet type.

10. A system filter a packet, the system comprising:
a software defined networking (SDN) controller to control a list of domains and to selectively filter the packet, wherein the list of domains comprises a blacklist of domains;
a network device to filter the packet for a packet type and to receive the list of domains from the SDN controller, the network device comprising:
a ternary content addressable memory (TCAM) filter to receive the packet and to determine whether the packet is a defined packet type, wherein the defined packet type is a domain name service (DNS) request;
a Bloom filter to receive the packet from the TCAM filter based on the determination that the packet type is a defined packet type and to compare the packet against the list of domains in a Bloom table to determine whether the packet is a matched packet or an unmatched packet; and
a processing resource to receive the packet from the Bloom filter based on the determination that the packet is a matched packet and to determine whether the packet is an exact match, wherein based on a determination that the packet is an exact match, the processing resource is to drop the packet and send an error message to indicate an error to a sender of the packet, and wherein based on a determination that the packet is an unmatched packet or based on a determination that the packet is not an exact match, the packet is forwarded to the SDN controller.

11. The system of claim 10, wherein the network device is an edge device, a switch, a router, or a combination thereof.

12. The system of claim 10 wherein the list comprises a whitelist of domains and based on the determination that the packet is an exact match, the processing resource is further to forward the packet according to a normal forwarding procedure to resolve the DNS request, and based on the determination that the packet is an unmatched packet or based on the determination that the packet is not an exact match, the packet is forwarded to the SDN controller.

13. A method of filtering a packet for a packet type at a network device, the method comprising:
receiving the packet at a filter of the network device;
determining, at the filter, whether the packet is a defined packet type; wherein the defined packet type is a domain name service (DNS) request;
based on the determination t the packet is not a defined packet type, forwarding the packet according to a normal forwarding process;
based on the determination that the packet is a defined packet type, receiving the packet at a Bloom filter of the network device from the filter;
receiving, at the Bloom filter, a list of domains, wherein the list of domains comprises a blacklist of domains;
determining, at the Bloom filter, whether the packet is a matched packet or an unmatched packet by comparing the packet against the list of domains;
based on the determination that the packet is a matched packet, receiving the packet at a processing resource of the network device from the Bloom filter; and
determining, at the processing resource, whether the packet is an exact match;
based on the determination that the packet is an exact match, dropping the packet and sending an error message to indicate an error to a sender of the packet; and
based on the determination that packet is an unmatched packet or a determination that the packet is not an exact match, forwarding the packet according to a normal forwarding procedure.

14. The method of claim 13, wherein the list of domains comprises a whitelist of domains, and wherein the method further comprises:
based on the determination that the packet is an unmatched packet or the determination that the packet is not an exact match, dropping the packet and sending an error message to indicate an error to a sender of the packet; and
based on the determination that the packet is an exact match, forwarding the packet according to a normal forwarding procedure.

* * * * *